O. Tufts,
Elevator.
N° 25,061.  Patented Aug. 9, 1859.
2 Sheets, Sheet 2.
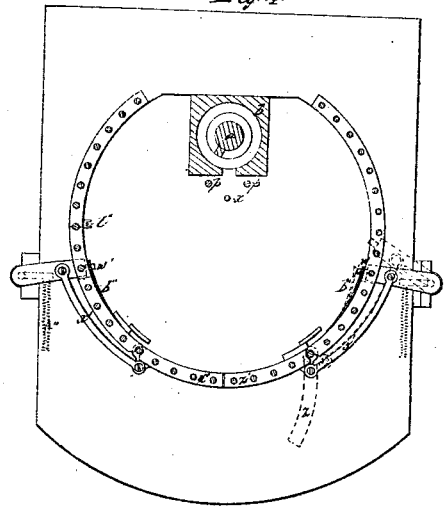
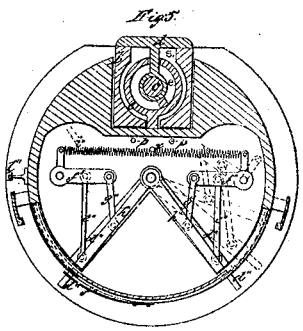
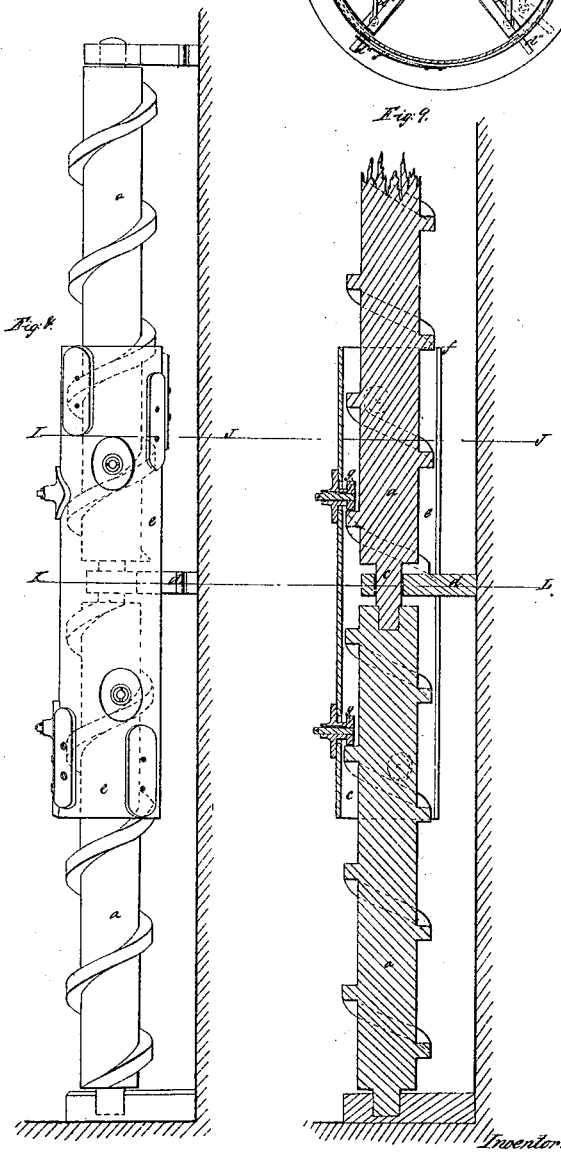
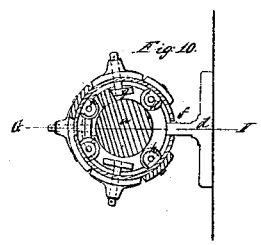
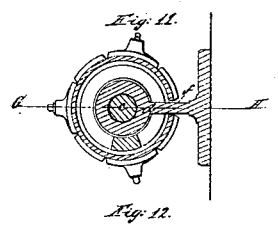
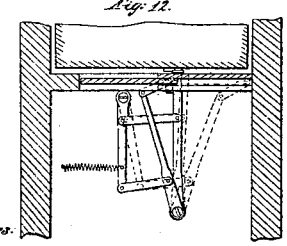
Witnesses:  Inventor:

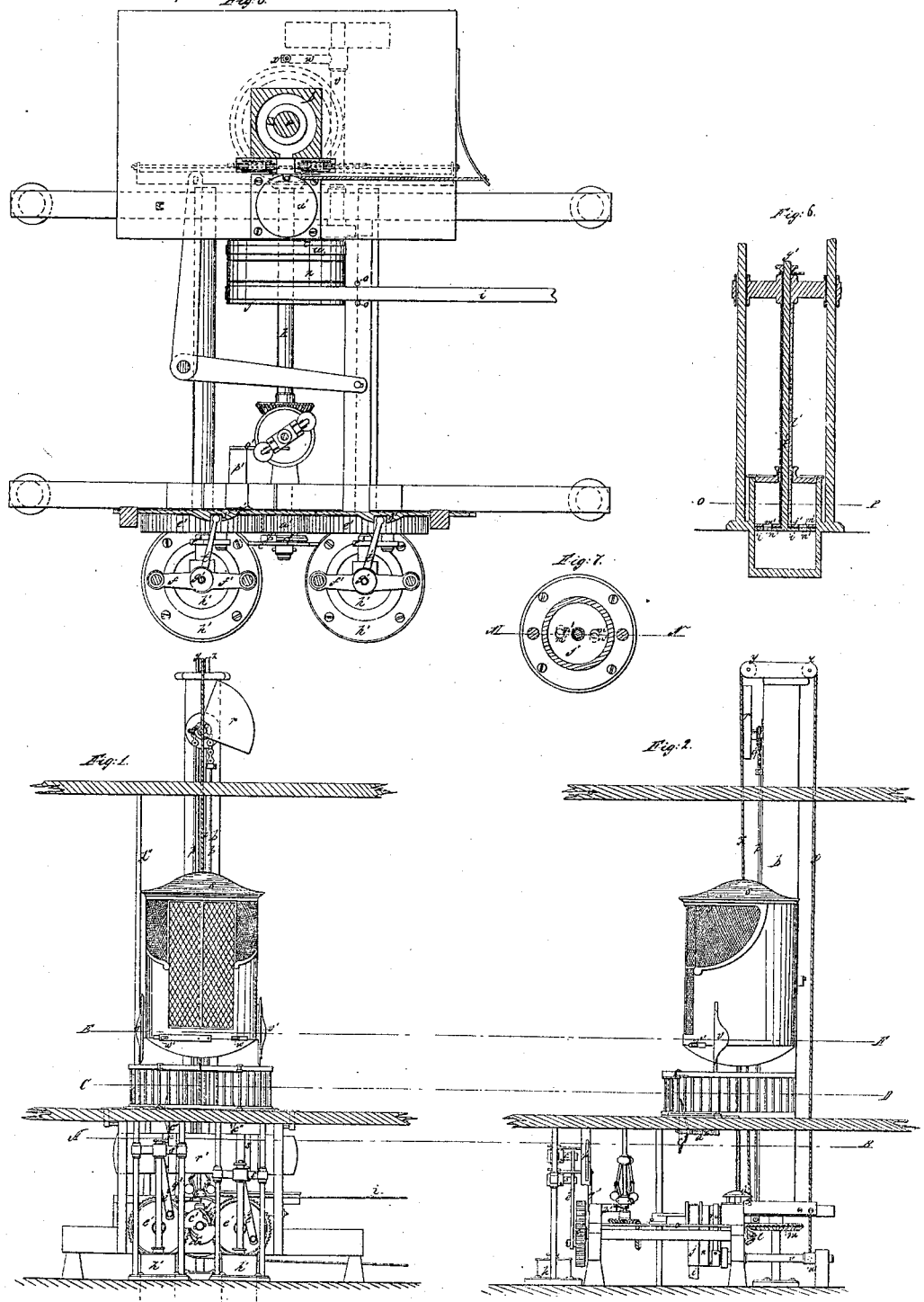

UNITED STATES PATENT OFFICE.

OTIS TUFTS, OF BOSTON, MASSACHUSETTS.

ELEVATOR OR HOISTING APPARATUS FOR HOTELS, &c.

Specification of Letters Patent No. 25,061, dated August 9, 1859.

*To all whom it may concern:*

Be it known that I, OTIS TUFTS, of Boston, county of Suffolk, and State of Massachusetts, have invented certain new and useful Improvements in Elevators or Hoisting Apparatus, which are more particularly intended for carrying persons with perfect ease and safety either to or from any height or apartment of a building or to be used in mines or on mountain slopes, my machine being adapted for ascending either vertically or on any slope which may be deemed too great for ordinary carriages.

The great object of my endeavors, has been to construct an elevator for the conveyance of persons from the different stories of hotels, public buildings and even private residences, which shall be free from the extreme and ordinary dangers, of suspension upon chains, ropes, or cords, of any kind, in the safety of which, every additional experience has led me to place less and less reliance. Indeed, although the ordinary reliable strength of such means of suspension are under fixed theoretical and experimental rules, yet every engineer is aware, that in suspension by "running rigging", in particular, these rules are liable to be disturbed by causes, sometimes the most incalculable, and paradoxical, and in many instances, with serious, and fatal results. Within my own knowledge several instances have occurred, in which ropes and chains, which were deemed amply sufficient, and which, had in fact, carried far greater weights, hundreds of times over the same height, have given way, under what was deemed very inferior loads, and in two instances which I have specially in my mind, at this moment, the loss of valuable lives was the result. To obviate these difficulties and dangers—and if possible, to construct a machine, that may truly possess and inspire that confidence in its safety and security, which the increasing heights of our hotels and other public buildings in large cities demands; after much study and investigation, and with an unconquerable dread and distrust of the principle of suspension, when human life is at stake, I have adopted the principle of a screw or revolving helical column, extending from bottom to top of the building, and to a nut, which is fitted to this screw, the passenger car is attached, the screw is revolved by steam or other kind of motive power. I am well aware that the screw itself, is an old, and much used device for raising weights in general; but, as far as I am informed the principle of the screw, has never been used to take the place of that of suspension in elevators, or in fact to raise bodies to any considerable height, and there are many practical difficulties in adapting it to these purposes, and the practical means which I have devised and invented, for overcoming these difficulties, form the most prominent basis of this application, though there are some other relative contrivances, which I have discovered in the course of my experiments, some of which, are more or less adapted to other descriptions of elevators, than those particularly described herein, but which are described in connection therewith, in the following specification.

I style my machine as completed, "my vertical railway elevator."

The accompanying sheets of drawings represent one of my machines, the elevation of which can be extended to any number of stories, or to any reasonable height required.

Similar letters represent similar parts in all the views.

Figure 1 is a front view of the machine. Fig. 2 is a side view. Fig. 3 is an enlarged horizontal section, on line A, B, showing a general plan view of the elevating machinery in the basement of the building. Fig. 4 is an enlarged horizontal section, on line, C, D, showing in particular the arrangement of the system of levers, by which the doors of the galleries of the building, are opened and closed and fastened automatically by the cams on the ascending car. Fig. 5 is a horizontal section through the car, on line E, F, the upper floor of the car, being represented as removed, to show the system of levers and springs, by which the doors of the car are opened and closed, and fastened, at each landing, by means of the cams, affixed to the sides of the opening in the floor or well-room. Figs. 6, 7, 8, 9, 10, 11 and 12 are illustrative, descriptive and detail views, which will be more particularly referred to hereinafter.

The operation of my machine may be described as follows:

*a*, represents the elevating columnar screw, extending from bottom to top of the building; it is represented in the drawing as inclosed in a wooden case *b*, though this case is no necessary part of the machine, except for appearance. I make the elevating screw in sections, coupled together by metallic pins or journals c, as shown in Figs. 5, 8, 9 and 11 and having bearings or supports d, secured at intervals to the floors or upright walls of the building. These bearings or supports are of great importance, inasmuch as they enable us to reduce the weight and strength of the screw column. Making the screw in sections will also add to the convenience, and greatly reduce the expense of setting up the screw; and indeed, making of the screw in one length, and extending it, and setting it up in a building of any considerable height, may well nigh be set down as impracticable. The necessity of these bearings however, calls for a novel and very peculiarly constructed nut, to enable it to pass up by them, and this difficulty, I claim to have overcome, in a practicable manner. I make the nut $e$, to which the car is attached, with an opening, or slot, $f$, on the back or side, of sufficient width to pass up by the bearings, and I make the nut of sufficient length, that is, with a sufficient amount of female screw thread to pass over and retain its hold on the male thread of the screw column, notwithstanding the breach caused by the space taken by the bearing. I do not limit myself to any particular width of the slot, as it may be increased to one half of the circumference of the nut, or more, by having vertical guides on the opposite of the car or platform, to keep the nut in contact with the screw.

The construction of the nut, and its application to the screw column, are more clearly shown in the enlarged detail views, Figs. 8, 9, 10, and 11.

Fig. 8 is a side elevation of the nut, and a portion of the screw column. Fig. 9 is a vertical section of the same, on line G, H. Fig. 10 is a horizontal section of same on line I, J. Fig. 11 is a horizontal section of the same on line K, L, this section being taken through one of the stays or bearings.

It will be observed that I make the screw column with a somewhat large and coarse thread, and of such rise that the weight of the car will readily reverse the motion and run down when the power is detached.

To reduce the friction of the machine to the smallest possible amount, I insert in the nut, a number of anti-friction wheels or rollers, as shown by the drawings, the rollers, $g$, $g$, $g$, being those which support the weight of the nut and car, upon the inclined surface of the screw thread, and the smaller rollers, $h$, $h$, $h$, being to keep off the lateral pressure of the nut from the screw column, and still the arrangement of these anti-friction wheels or rollers is such, that they will pass over the space caused by the bearing, with the same facility that a nut, with a continuous female screw thread would do. Thus it will be seen that the strain in all directions, comes upon the antifriction rollers, which will entirely enable us to dispense with the use of oil upon the screws, which in hotels and other buildings, in warm weather, is exceedingly desirable, besides saving the expense and labor of oiling.

To propel the screw column at the proper speed for elevating, the power may be applied in any convenient manner, or, through any convenient combination of machinery. In the present case as represented in the drawings, the driving belt $i$, through the pulley $j$, turns the shaft $k$, and thence, through the beveled wheels $l$, and $m$, operates on the screw column.

$n$, is a loose pulley upon the same shaft $k$, on to which, the driving belt is shipped, by means of the shipper $o$, when the power is to be thrown off. This shipper is operated by means of the rods $p$, $p$, which pass up through the car, the whole height of the building, and which are connected by a chain, and pass over a pulley $q$, at the top. It will also be observed that, there is a counterbalancing metallic sector, $r$, at the top of the machine, the object of which, is, to shift the belt, and throw off the power automatically, when the car arrives at the top, and thus prevent breaking or slipping the driving belt, every other part of the machine being of adequate strength to insure that result, in case it should fail to act automatically. As the car approaches the top, the canopy of the car $s$, strikes and throws up the metallic sector, $r$, till it passes the center of gravity, when it descends on the other side by its own weight and operates the rods $p$, $p$, sufficiently to throw the belt on to the loose pulley, thereby disconnecting the power.

$t$, is a friction pulley, and $u$, a friction strap brake, which is operated through the shaft $v$, and the lever $w$, by means of the cord $x$, which passes up, over the pulleys $y$, and $z$, and thence down through the car or platform, so as to be accessible within the car, its office being to check, or perfectly stop, the descending motion of the car at the will of any person, within the car or on the gallery.

The great advantage of running the shipping rods, $p$, $p$, and the cord or rod $x$ up through the car itself, is, that, they are thus rendered accessible to the conductor or any person within the car, without incurring the danger of protruding the hand or arms beyond the same while in motion.

I now come to describe a novel and very peculiar apparatus in connection with elevators, which I term my "fluid safety retarder," under the control and protecting care of which, it is my purpose to place, and at all times keep, the descending motion of the car.

It must here be observed, that the best class of elevators now in use, both hoist and lower by action of the propelling power, whereas it is my purpose to descend by the action of gravitation, duly controlled, and thus not only save the power used in descending, but, also relieve us from another contingency, viz.: the slipping of the belt from the governor, in case of which, the engine when lightly loaded sometimes starts up suddenly to a high rate of velocity, the occurrence of which, during a descent might render the consequences, nearly, or quite as serious as an unobstructed fall.

The principle of this apparatus is that of regulating the descent of the car, platform or other burden by the flowage or force of water or other fluid, through restricted apertures. And the particular means by which I accomplish this result, in this machine, may be described as follows: though the form and arrangement of the apparatus may be changed in many particulars without departing from its peculiar principles.

It will be observed in the drawings, that the shaft $k$, is extended to some length beyond the driving pulley $j$, and on this shaft is a loose cog wheel $a'$, firmly attached to which, is a ratchet wheel $b'$, which is, of course also loose on the shaft. There is also, another wheel $c'$, which is fixed on the shaft, and in which are set a number of pawls $d'$—$d'$, which pawls take no hold on the ratchets of the wheel $b'$, when the motion of the shaft is in one direction, and the car is ascending; but as soon as the power is disconnected, and the car begins to descend, and the shaft $k$, commences to revolve in the opposite direction, the pawls $d'$, take in to the ratchets of the wheel $b'$, which causes the revolution of the cog wheel $a'$, and incidentally the two cog wheels $e'$, $e'$, which are in connection therewith, and these wheels in turn, by means of the connecting rods $e^3$, $e^3$, and the cross-heads $f'$, $f'$, operate the pistons $g'$, $g'$, which by a reciprocating motion in the cylinders of water $h'$, $h'$, check any tendency to acceleration in the motion of the machine while descending.

The peculiar construction of the pistons is shown in Figs. 6 and 7, Fig. 6 being a vertical section of one of the cylinders and pistons on line M, N, of Fig. 7, and Fig. 7 being a horizontal section on line O, P, of Fig. 6. It will be observed that the piston consists of two circular plates $i'$, and $j'$, and the piston rod of one circular bar $k'$, which is inclosed in a hollow cylinder rod $l'$, and the lower plate $i'$, is secured to the rod $k'$, and the upper plate $j'$, is secured to the rod $l'$, it will also be observed that there are holes $m'$, $m'$, in the upper plate, and corresponding holes $n'$, $n'$, in the lower plate, and that the position of these holes with reference to each other regulates the passage or water-way, from the compartment of the cylinder above the piston, to that which is below, and thus regulates the amount of retardation, and it will readily be perceived that by the facility afforded by the hollow piston rod, the two plates of the piston are easily set in any relative position desired, and secured in such position by a clamp-screw at the top, or I sometimes apply a governor as is also shown in Figs. 1, 2, and 3, to regulate automatically the positions of the two plates of the piston and consequently the effective water passage from one compartment to the other and thus maintain an equable rate of descent, whatever may be the burden upon the descending car.

The operation and application of the governor will readily be perceived to be as follows: The governor being of the common fly ball, or any equivalent form takes hold upon in the usual manner and operates the lever $o'$, and thence through the rocking shaft $p'$, and the lever $q'$, it acts upon the slide $r'$, in which are one or more vertical grooves $s'$ (corresponding with the number of the water cylinders). These grooves receive the ends of, and operate the levers $t'$, which are attached to the inner piston rod $k'$, and thus the relative position of the two plates is varied and regulated, according to the expansion of the governor and speed of the machine.

$u'$ is a spring or bunter to prevent the car from striking the bottom with too much force and which I term the arrester. The arrester may be either a metallic spring, or a cushion of air or india rubber, or any elastic substance, and still perform its office, which is one of special importance, in combination with the fluid retarder, for although the retarder effectually prevents the acceleration of the machine beyond a certain rate of descent, yet in practice it will be always found desirable to have that rate greater than it would be safe, or at least comfortable, to have the motion of the car suddenly checked by the interposition of any perfectly rigid substance. The arrester thus comes into service with a degree of elasticity which, while it might not, and probably would not be sufficient to receive with safety the unchecked fall of the car from any considerable height, is yet amply sufficient easily and gently to arrest the retarded and regulated motion of the car whenever it is suffered to run to the bottom.

I construct my passenger car with a strong canopy or covering at the top to prevent any articles from falling from the upper stories down upon the passengers, and such portions of the car as are left open for light and air, I protect with lattice or net-work, so that no heads or arms of the passengers can possibly be extended beyond the car to be injured in passing the different floors of the building, all of which appears in Figs. 1 and 2.

Fig. 4 shows the system of levers and springs by which I open and close and fasten the doors of the galleries by means of cams on the car, and Fig. 5 the system of levers and springs by which I open, and close and fasten the doors of the car by means of cams on the sides of the gallery floors. My object has been in both cases to multiply the leverage so that a comparatively small cam, shall be sufficient to give the requisite motion to the doors, as in Fig. 4, for instance, the cams $v'$, $v'$, shown in Figs. 1 and 2 act upon the levers $w'$, $w'$, and thence by the connecting bars $x'$, $x'$, upon the doors $z'$, $z'$, the springs $a''$ $a''$ close the doors, and the spring latches $b''$ fasten the same, after the cams have passed by, as is clearly shown by comparison of Figs. 1, 2, and 4, and again in Fig. 5, the cams $c''$ shown in Figs. 1, and 2, act upon the levers $d''$, and thence by the connecting rods $e''$ upon the levers $f''$, and thence with an increased or multiplied leverage, through the connecting rod $g''$, upon the lever $h''$, the outer end of which is attached to, and opens and closes the door of the car. After the cams have passed by, the spring $i''$ acts through the levers and closes the doors, and fastens them by a spring latch $j''$, similar to that described for fastening the doors of the galleries and shown in Fig. 4.

Fig. 12 is an illustrative view, showing how sliding doors of the galleries may be opened and closed by cams on the moving car; but as the principle is substantially the same, as those before described, a more precise and detailed description is deemed unnecessary.

$k''$, is a stud, or projection, on the car, which runs in a vertical groove, $l''$, attached to the building to prevent any torsionary movement of the car, by action of the screw.

Having thus described my improvements, what I claim as my invention and desire to secure by Letters Patent, is—

1. I claim for the purposes of elevating, the combination of the screw, and the passenger car, or platform.

2. I claim the construction of a screw for elevating, having stays, or bearings, at intervals attached to the wall of a building, or any fixed adjacent structure.

3. I claim the construction of a nut, with a slot or opening in the back, or side, to enable it to pass by the bearings or stays before referred to, and as hereinbefore described.

4. I claim constructing a nut or carriage with wheels or rollers, running upon the thread of the screw, substantially as described.

5. I claim controlling the descending motion of elevators, or hoisting apparatuses by means of fluid retarders, constructed substantially as described.

6. I claim regulating the action of fluid retarders by means of a fly ball governor or its equivalent substantially as described.

7. I claim the construction, arrangement and operation of passenger cars of an elevator or hoisting apparatus substantially as described, that is providing the platform with side walls and doors or gates, said doors or gates being combined with suitable mechanism arranged in relation to stationary cams or projections on the gallery floors or any contiguous parts of the building so as to open and close automatically in the manner and for the purposes substantially as set forth.

8. I claim opening and closing the doors of the galleries or landings, automatically, by means of cams or projections on the car, through a system of compound or multiplying levers, constructed and arranged substantially as herein described, and for the objects herein set forth.

9. I claim fastening and unfastening, automatically the doors or gates of the car, by spring latches, or their equivalents, operated by cams, or projections upon the gallery floors, or adjacent walls of the building, substantially as described.

10. I claim fastening and unfastening, automatically the doors or gates of the galleries or landings by spring latches, or their equivalent, operated by cams or projections upon the car, substantially as described.

11. I claim the arrester $u'$ in combination with the fluid retarder for the objects and purposes set forth.

12. I claim passing the shipping rods and the cord, or rod that operates the friction brake, through the car or platform for the objects and purposes set forth.

OTIS TUFTS.

Witnesses:
LUTHEN BRIGGS, Jr.,
DAVID F. HICKS.